(12) United States Patent
Latham

(10) Patent No.: US 6,184,857 B1
(45) Date of Patent: Feb. 6, 2001

(54) COMPUTER-IMPLEMENTED METHOD OF RENDERING AN IMAGE OF SMOKE

(76) Inventor: Roy W. Latham, 33944 Whimbrel Rd., Fremont, CA (US) 94555

( * ) Notice: Under 35 U.S.C. 154(b), the term of this patent shall be extended for 0 days.

(21) Appl. No.: 08/307,028

(22) Filed: Sep. 15, 1994

Related U.S. Application Data

(63) Continuation of application No. 08/000,002, filed on Jan. 4, 1993, now abandoned.

(51) Int. Cl.[7] .............................. G09G 5/00; G06T 15/00; G06T 15/30
(52) U.S. Cl. .......................... 345/112; 345/419; 345/434
(58) Field of Search ............................ 395/127; 345/419, 345/434, 112

(56) References Cited

U.S. PATENT DOCUMENTS 5,083,287 * 1/1992 Obata et al. ......................... 395/126

OTHER PUBLICATIONS

Gardner, Geoffrey *Computer Graphics* "Visual Simulation of Clouds Proceedings" 1985 p. 297–303.*
Sakas et al, *Computers & Graphics* "Sampling and Anti- -Aliasion of Discrete 3D Density Texture" 1992 p. 121–134.*
Willis, PJ, *Computer Graphics Forum,* "Visual Simulation of Atmospheric Haze" 1987 p. 35–42.*
Ebert et al. *Computer Graphics,* "Rendering and Animation of Gaseous Phenomenom by . . . " 1990 p. 357–66.*
Kahya et al, *Computer Graphics,* "Rendering Fun with 3D Textures" 1989 p. 271–280.*

"Battlefield Smoke—A New Dimension in Networked Simulation", Rick D. Bess et al., Industry/Interservice Training Systems Conference Proceedings, Dec., 1991,, p. 256.

* cited by examiner

*Primary Examiner*—Krisna Lim
(74) *Attorney, Agent, or Firm*—Kenneth W. Float

(57) ABSTRACT

A method of simulating the appearance of smoke in an electronically generated video image that uses one or more intersecting opaque spheres. Each sphere has a nonuniform smoke density that produces feathered edges. The smoke sphere is an object modeled as a center point (the coordinates of the center of the sphere in three dimensions), a radius (in database coordinates), and a set of parameters that include density and color. The center point is transformed into display screen coordinates, and the radius is transformed into a screen coordinate length. The sphere is projected into a circle in screen coordinates, and a bounding square is generated in screen coordinates that is centered at the sphere center point. The bounding square is then converted into a transparency having color and density attributes added to its data structure. Thus the bounding square has the same data structure as transparent or opaque objects and is processed in the same manner. The transparency is clipped to the boundaries of the display screen. Occlusion processing may then be performed wherein objects located within the smoke cloud are occluded, based upon their relative distance into the cloud. After occlusion processing, a stack of distance-sorted objects are generated to produce an output pixel. If a object has not been occluded for a pixel, it is displayed on the display screen, along with the smoke and other objects. A typical smoke cloud includes several spheres, including one or two large ones that intersect terrain surfaces to appear as hemispheres. The present method forms a smoke cloud that is perspectively invariant, and offers much greater flexibility to provide for dynamic changes in the shape of the smoke cloud.

5 Claims, 4 Drawing Sheets

COMPUTER-IMPLEMENTED METHOD OF RENDERING AN IMAGE OF SMOKE

This application is a continuation of application Ser. No. 08/000,002 filed Jan. 4, 1993, now abandoned.

BACKGROUND

The present invention relates generally to smoke simulation methods, and more particularly, to a method of simulating smoke in an electronically generated video image that uses one or more opaque spheres to simulate the smoke.

Battlefield smoke is an important element of cover and concealment. To be effective in battlefield simulations, smoke simulation should include a number of attributes, including the following. The smoke should have controllable size, color, and density to model its creation, battlefield obscuration, and dissipation. The smoke should have limited extent and be three-dimensional in appearance. The term "volumetric smoke" is sometimes used to distinguish the desired effect from that achieved with conventional translucent planes used to simulate smoke. Objects should be obscured in proportion to their distance into a smoke cloud. The smoke cloud should appear perspectively correct and perspectively invariant. The smoke cloud should look as if it were the same object regardless of the viewpoint of the observer. The smoke should look realistic.

In practice, realism and perfection in a computer implemented simulation are compromised in the interests of minimizing costs. One proposed battlefield smoke simulation implementation uses one set of compromises, and is described in a paper published in the December, 1991 Industry/Interservice Training Systems Conference Proceedings. In addition, there are conventional smoke generation methods that make nice looking smoke and cloud images on computer displays, but they run very slowly and are not suitable for high speed rendering required for an image generator that produces 15 to 60 frames per second.

Heretofore there has been a unmet need in the smoke simulation art in that smoke is needed for training tank crews and others in simulated battlefield encounters. Existing image generators do not provide the required perspectively correct volumetric aspects of the smoke, i.e., things should gradually disappear as they become immersed in the smoke. The approach described in the above-cited paper is not perspectively correct and seems expensive to implement. The conventional method is to model smoke using textured translucent polygons, somewhat like glass paintings. However, the "glass painting" are not volumetric and do not look very realistic.

The basic equations used in simulating smoke are discussed below, along with a discussion of the above-cited proposed battlefield smoke simulation implementation. The basic light attenuation equation that applies to most light absorbing media, like smoke, clouds, dust, and haze is:

$$dI/dz = -I/p,$$

where I is light intensity, p is smoke density, and z is distance through the smoke. Assuming a uniform density, this equation may be integrated to yield an attenuation function:

$$I = I_o \exp(-z/p)$$

where $I_o$ is incident light intensity, and I is the intensity remaining after traversing a thickness z of the absorbing medium (smoke). The parameter p is a thickness that reduces the light intensity to 1/e of its incident value. For a color image, there are three such equations for red, green, and blue components of the image.

The above exponential attenuation function is the same as for haze fading, which is identically derived. The color components of a pixel are also generated using a factor $f = \exp(-z/p)$, and the output color components are given by:

$$I_{out} = f I_{object} + (1-f) I_{smoke}$$

for each of the three color components of an object and the smoke.

From these equations it has been determined that the keys to an effective smoke generation method are determining how much smoke has been penetrated by the light path, computation (or by using a precomputed lookup table) of the integral of the smoke density (which is exponential if the density is uniform), and application of the attenuation function using f and (1–f). To obtain interesting variations in a smoke cloud, a way must be provided to vary the light penetration distance or the density of the smoke cloud, or both.

The above-cited proposed method of generating simulated smoke varies the computed penetration depth of the smoke using texture maps. In the proposed method, a nominal smoke depth is first computed. The smoke surface starts out as a faceted, polygon model that always faces the viewpoint. The polygon smoke model is similar to a billboard polygon used to receive a color and transparency map for a billboard tree. The "smoke billboard" is gimballed to face the viewpoint in both azimuth and elevation angles, and it uses multiple polygons to approximate a curved surface, much like a piece of the surface of a sphere gimballed around the center of the sphere.

The smoke billboard is textured using two or more parameters. One parameter varies the intensity of the billboard surface, providing a picture of a smoke cloud. A second parameter is added to the nominal smoke depth before computing a smoke fading factor. Varying the depth indirectly provides variations in the transparency of the smoke. The concealment of an object at any point depends upon both the geometric distance from the front of the billboard and upon the texture-induced variation.

One virtue of the above-cited conventional method is that still frames look impressively realistic. The principal drawback, however, is that the smoke is not perspectively invariant. A cloud looks the same in every detail whether viewed from the north, south, east, west, or from above. To keep this perspective flaw from being too obvious, the conventional method models clouds that are close to hemispheric in shape, and which by symmetry, have an outline that is nearly the same when viewed from all directions. A second apparent limitation of this method is that while the smoke objects can be scaled geometrically and the overall transparency can be varied, it is not easy to continuously vary the basic shape for swirling effects or for dissipation.

SUMMARY OF THE INVENTION

In contrast to the above-described proposed method, the present invention models smoke as one or more intersecting spheres. Each sphere has a nonuniform smoke density that produces feathered edges. Although a single sphere may be used in some applications, a typical smoke cloud includes about five or six spheres, including one or two large ones that intersect terrain surfaces to appear as hemispheres. The present method forms a smoke cloud that is perspectively invariant, and offers much greater flexibility to provide for dynamic changes in the shape of the smoke cloud.

The smoke sphere is an object modeled as a center point (the coordinates of the center of the sphere in three dimensions), a radius (in database coordinates), and a set of parameters that include density and color. The center point is transformed into display screen coordinates, and the radius is transformed into a screen coordinate length.

To save computation, an approximation is used wherein the sphere is projected into a circle in screen coordinates. Unless the sphere happens to be centered in the image, it projects to an ellipse. However, for a narrow fields-of-view per channel for CCTT images, and taking into account the amorphous nature of smoke clouds, the error caused by this approximation does not cause a viewing problem.

Using the screen coordinate approximation (the projected circle), a bounding square is generated in screen coordinates that is centered at the sphere center point. Each edge of the square is located at a distance from the center of the sphere equal to the radius of the circle in screen coordinates, and the distance to each respective vertex of the square is equal to the distance to the center of the sphere minus the radius (in database coordinates).

The bounding square is then converted into a transparency, but in addition, color and density attributes are added to its data structure. The bounding square has the same data structure and is processed in the same manner as transparent or opaque objects. The bounding square is clipped to the boundaries of the display screen. Occlusion processing is then performed wherein objects located within the smoke cloud are occluded, based upon their relative distance into the cloud. After occlusion processing, a stack of distance-sorted objects are generated to produce an output pixel. If an object has not been occluded for a pixel, it is displayed on the display screen, along with smoke and other translucent objects.

More specifically, the present invention comprises a computer-implemented method for rendering an image of smoke or clouds in an image generator for display of pixels on a display device. The method comprises the following steps. The first step provides for modeling the smoke as a sphere having nonuniform smoke density, wherein the sphere is comprised of a center point in three-dimensional model space, a radius, and set of parameters defining its nonuniform density and color. The next step comprises transforming the center point to screen coordinates. The next step comprises transforming the radius to a screen coordinate radius. The next step comprises generating a bounding polygon that surrounds a projection of the sphere in screen coordinates. The next step comprises clipping the bounding polygon to boundaries of the display device.

For each pixel in the image, the present method renders a smoke effect by testing if the pixel is within the bounding polygon; computing an equivalent translucency factor for the smoke at the pixel based upon location of the pixel with respect to the transformed center point, the screen coordinate radius, the set of parameters defining its nonuniform density and color, and penetration depth through the smoke; and computing the smoke effect for the pixel based upon the equivalent translucency factor.

The present invention is primarily designed for use in an image generator, a specialized hardware device used to make images in real time for training and simulation. In a typical training and simulation environment, a user sits in a simulator cockpit and looks at images created to correspond to the users control actions. Smoke is generated to provide obscuration in typical battlefield situations, and the like.

A key advantage of the present invention is that it is compatible with existing image generator architectures that conventionally process polygons, including opaque and translucent ones. The present invention allows the smoke to masquerade as a polygon (the bounding polygon) through most of the front end processing. Then when the pixels are computed, the present invention makes a contribution to the pixel by adding in a transparent surface as if it were covering the pixel. Conventional processing then takes over to complete the computation of the pixel with the smoke included, but using conventional hardware and methods to achieve fading, texture, and translucency. Since image generators cost millions of dollars to design, the ability to add the smoke feature without having to start from scratch is a welcomed improvement, especially since conventional smoke implementations have been strained at best.

In addition to smoke simulation, the present invention also may be used to simulate clouds and dust, and the like. Those who model molecules using computer graphics may employ the present invention to model electron clouds, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
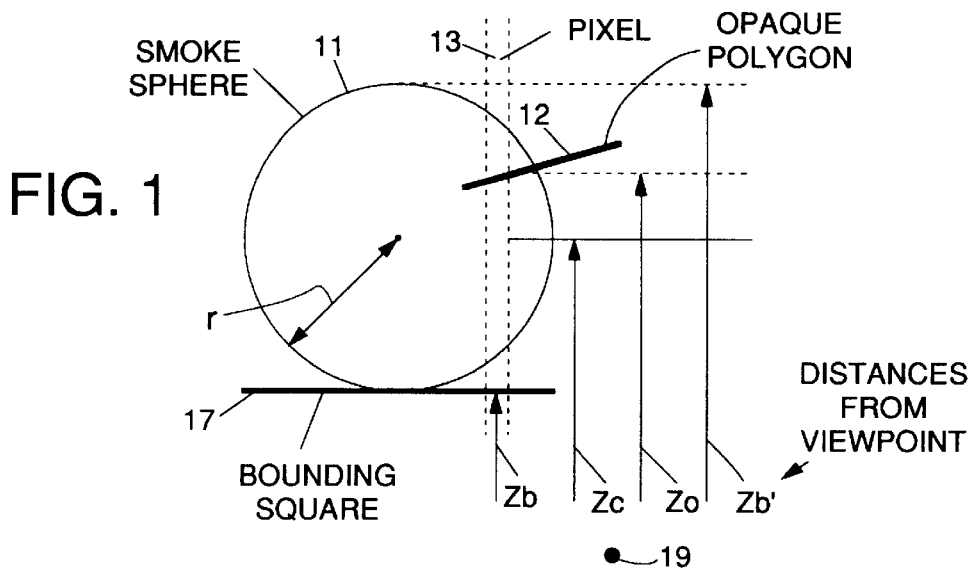
FIG. 1 is a plan view of a smoke sphere having a penetrating opaque object.

Referring to the drawing figures, an exemplary smoke generation method 10 in accordance with the principles of the present invention will be described. For ease of understanding, a simple case comprising a single smoke sphere 11 and a single opaque object 12 in a pixel 13 is shown, with both fully covering the pixel 13. This situation is shown in FIGS. 1 and 2, and FIG. 1 is a plan view showing the smoke sphere 11 (shown shaded) with penetrating opaque object 12, while FIG. 2 is a view of the smoke sphere 11 of FIG. 1 illustrated in display screen coordinates.

Figure 2:
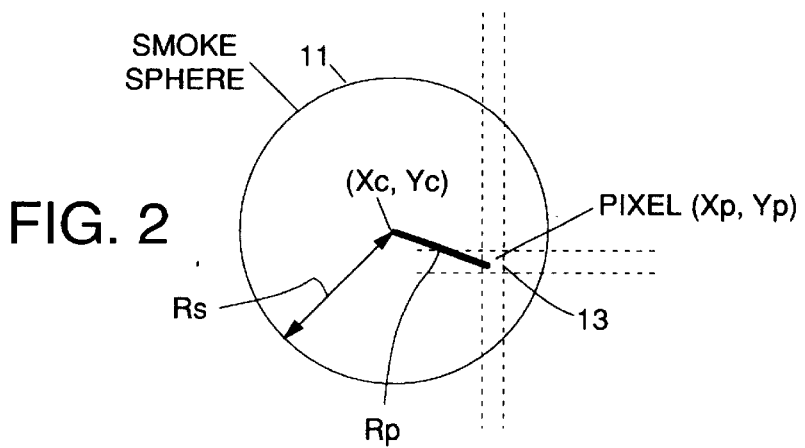
FIG. 2 is a view of the smoke sphere of FIG. 1 in screen coordinates.

An attenuation factor, fs, due to the smoke sphere 11 is the integral of the smoke density from Zb to Zo shown in FIG. 1. Zb and Zo are distances from a view-point 19 to the closest edge of the smoke sphere 11, and from the viewpoint 19 to a point where the opaque object 12 intersects the smoke sphere 11, respectively. The integral is a function of the perpendicular distance of the line of a light ray corresponding to the pixel 13 to center of the smoke sphere 11. In FIG. 2 this distance is shown in display screen coordinates as Rp. A virtue of spherical symmetry, which is maintained because the smoke density is a radially symmetric function, is that the integral does not depend on the angle of incidence into the smoke sphere 11 but only on the distance to its center.

A nonuniform smoke density is used, and integrals are precomputed and stored in a lookup table. The numbers in the lookup table are normalized to a unit sphere, and inputs to the lookup table are scaled to match the unit sphere. Data entries in the lookup table have the form $F_{SMOKE}[(Zo-Zb)/r, ((Xc-Xp)^2+(Yc-Yp)^2)/Rs^2]=F_{SMOKE}(Zn, Rp^2)$, where r is the radius of the smoke sphere 11 and Rs is the radius of the smoke sphere 11 in screen coordinates, Xc and Yc define the center of the smoke sphere, and Xp and Yp define the center of the pixel 13. The division factors required for normalization are performed using a table of reciprocals, for example, and the distance (Rs) from the center of the smoke sphere 11 remains squared to avoid performing a square root computation. The integral is computed for squared distance entries.

To apply the smoke attenuation factor, fs, the opaque object 12 has illumination, shading, and texture factors applied first. Then, the smoke attenuation factor is applied according to the equation:

$$I_{out}=fs \times I_{object}+(1-fs) \times I_{smoke}\qquad\text{Equation [1]}$$

After application of the smoke attenuation factor, atmospheric haze fading is applied, preferably using Zb as a fading distance, although Zo may also be used. For opaque edges within the pixel 13, the smoke attenuation factor is computed separately for each subpixel area. For multiple smoke spheres 11 in front of an opaque object 12 the attenuation and haze factors are computed separately and then applied in sequence in an order from far to near.

In the present method 10, smoke spheres 11 are processed like transparent objects (as a modified transparency), as will be described below. Equation [1] above has the same form as the equation used to apply a transparency factor and an atmospheric haze fading factor. All three effects, smoke, haze, and transparency, are derived using the same equation. Consequently, in the present invention, smoke spheres 11 are processed like transparent objects 21, as is illustrated in FIG. 3.

Figure 3:
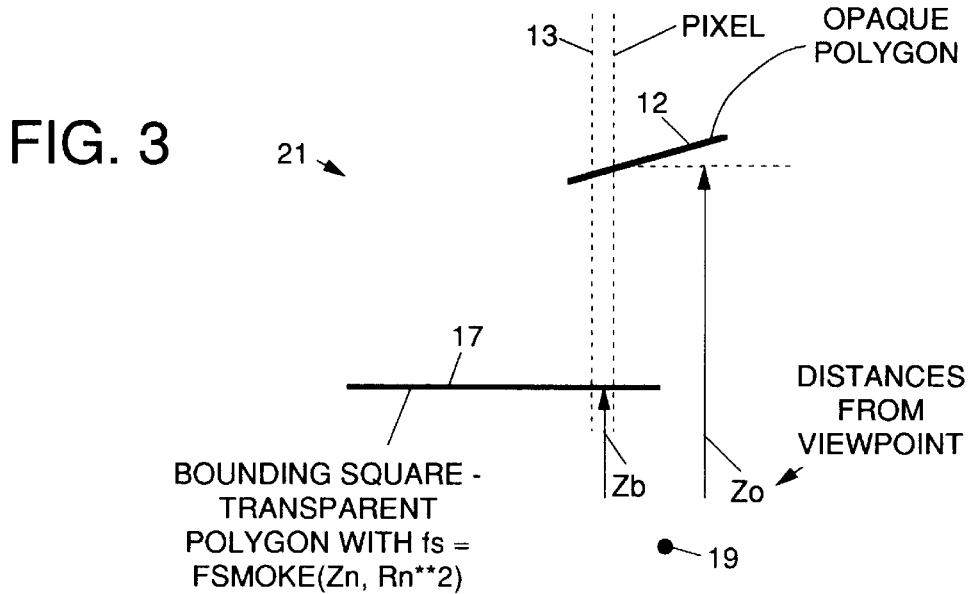
FIG. 3 illustrates how smoke-sphere computations derived from FIG. 1 are transformed into transparencies.

Referring to FIG. 3, transforming a single smoke sphere 11 into a transparent object 21 is straightforward. A bounding square 17 is transformed into a transparent object 21 having a transparency derived from the lookup table. The transparency derivation is performed after the various objects in the pixel (comprising the transparent object 21 and the opaque object 12) are sorted in distance order, and the transparency ascribed to the bounding square 17 is recomputed for each pixel 13. Once the transparency is assigned to the smoke sphere 11, it is processed as the transparent object 21. Atmospheric fading is applied to the smoke-related transparent object 21 corresponding to the bounding square 17 and to the opaque object 12 behind it. The opaque object 12 and transparent object 21 representing the smoke sphere 11 are then displayed on the display screen. Images are typically viewed on CRT's and other display devices, including projection screens, and head mounted displays, for example.

Figure 4:
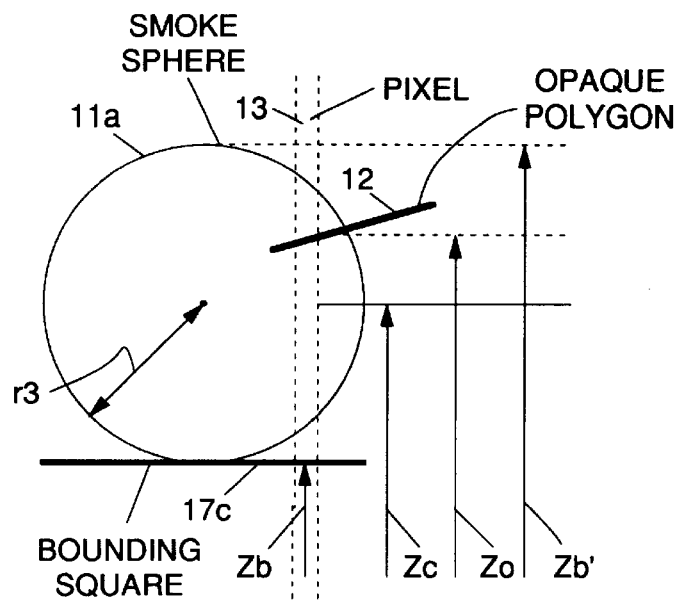
FIGS. 4 shows a plan view of a more complicated situation wherein several smoke spheres are penetrated by opaque objects.
Figure 4:
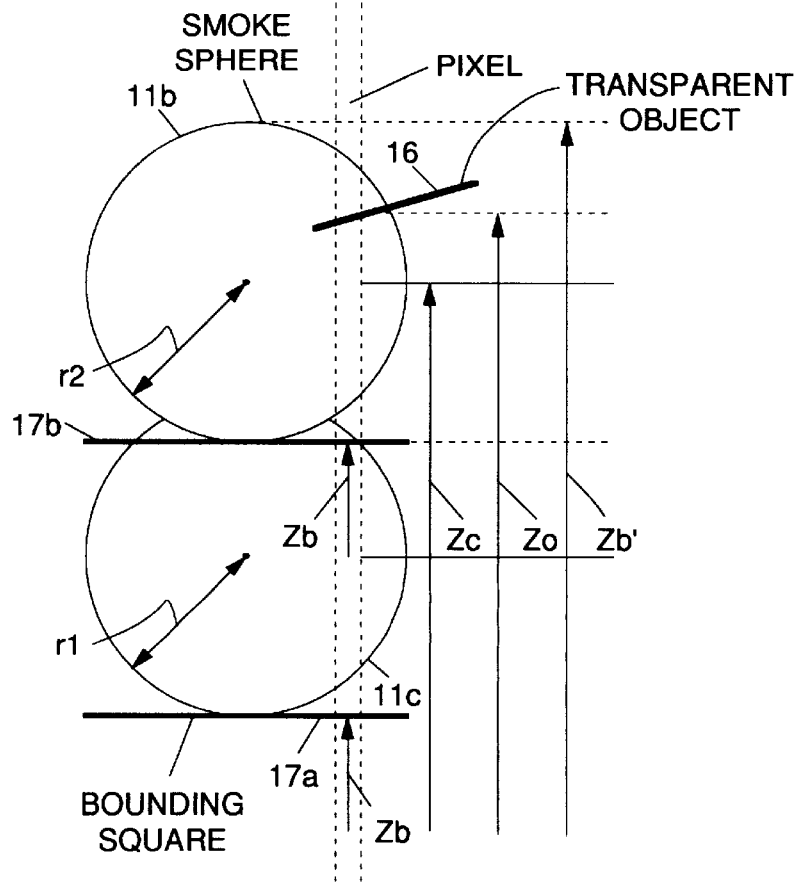
Figure 5:
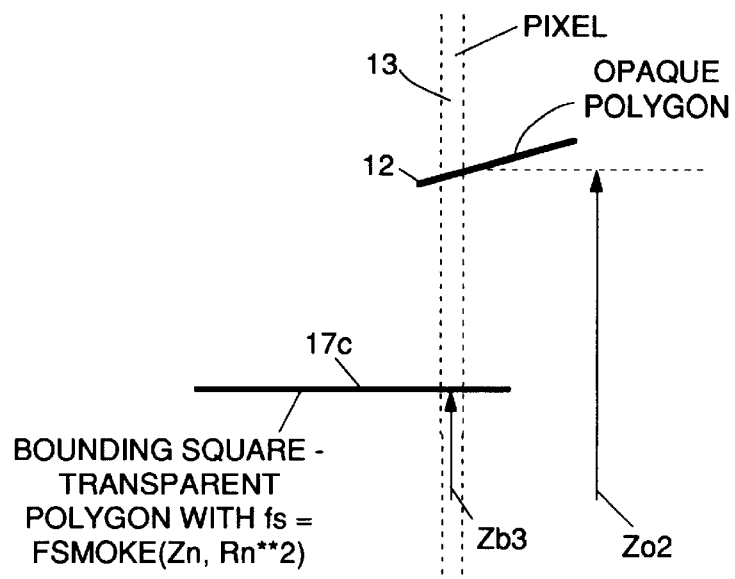
FIG. 5 is a view of the smoke spheres of FIG. 4 transformed into transparencies as in FIG. 3.
Figure 5:
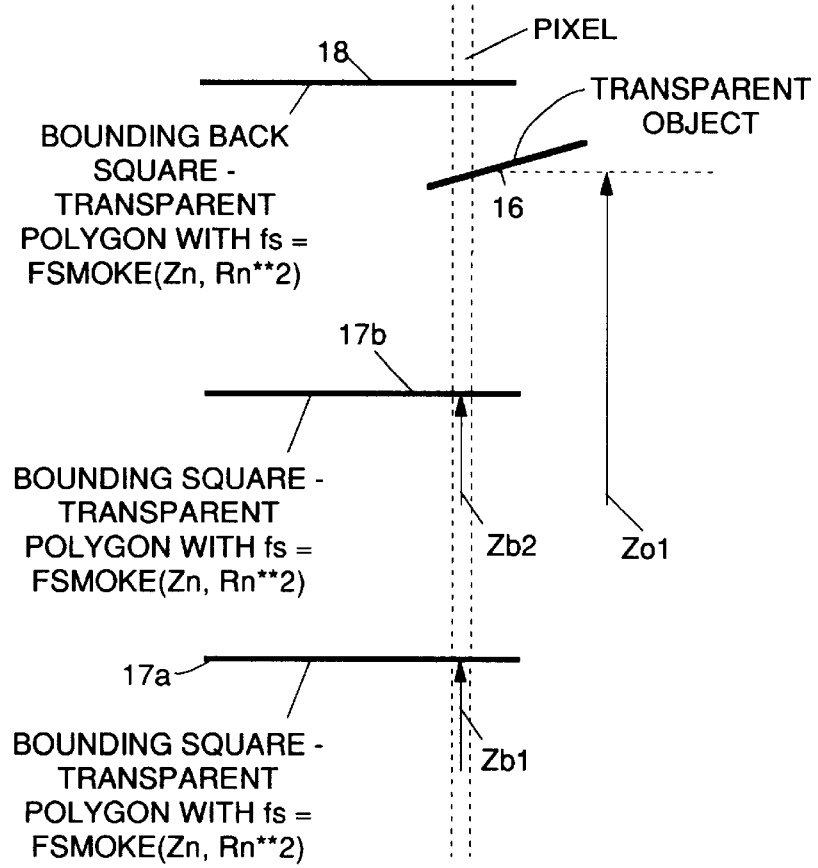

The transparency model employed in the method 10 of the present invention is applicable to much more complicated situations, such as is shown in FIGS. 4 and 5.

FIGS. 4 shows a plan view of a situation wherein several smoke spheres 11a, 11b, 11c are penetrated by opaque objects 12. FIG. 5 is a view of the smoke spheres 11a, 11b, 11c of FIG. 4 transformed into transparencies as in FIG. 3.

With reference to FIG. 4, three smoke spheres 11a, 11b, 11c having radii r1, r2, and r3, respectively, are shown. The first two smoke spheres 11a, 11b overlap, and the first sphere 11a is located in front of the second sphere 11b. Each sphere 11a, 11b, 11c has a bounding square 17a, 17b, 17c associated therewith. The pixel 13 is shown relative to each of the spheres 11a, 11b, 11c. A transparent object 16 is located in the second smoke sphere 11b, and an opaque object 12 is located in the third smoke sphere 11c. With reference to FIG. 5, the bounding square 17a, 17b, 17c for each smoke sphere 11a, 11b, 11c is transformed into transparencies. The fact that the transparent object 16 is located inside the second sphere 11b adds a complication, in that a transparency corresponding the the bounding square 17b must be generated to represent smoke in the second smoke sphere 11b which is behind the transparent object 16.

In the case when only one opaque object 12 is present, there is no need to represent the smoke behind it, because the opaque object 12 occludes the smoke. In the case when two smoke spheres 11 overlap, and no other object is involved, there is no need to separately consider the region of overlap. Even with overlapping smoke spheres 11, the attenuation associated with a smoke sphere 11 may be assigned to the bounding square 17 in front of it, so long as no other object is present.

Referring again to FIG. 5, the case of smoke located behind the transparent object 16 requires that a transparency be generated to correspond to a bounding back square 18. The transparency assigned to the bounding back square 18 is derived from the smoke lookup tables. In the case shown in FIGS. 4 and 5, the required smoke attenuation is the integral of the smoke density from Zo1 to Zb2', which is $F_{SMOKE}(\ldots Zb2',\ldots) F_{SMOKE}(\ldots Zo1,\ldots)$. The bounding back square 18 is created at the same time as the front bounding square 17a, but it is only needed when there is a smoke sphere 11 behind a transparent object 16 that is inside the smoke sphere 11. With the addition of the bounding back square 18, the present method 10 is applicable to all cases of overlapping smoke spheres 11 and transparent objects 16.

In the case where the viewpoint 19 is inside a smoke sphere 11, the value Z of the front of the smoke sphere 11 is changed to be that of a near clip plane, rather than using Zc−r. The integral computation then subtracts the attenuation due to the smoke sphere 11 that is behind the viewpoint 19.

Figure 6:
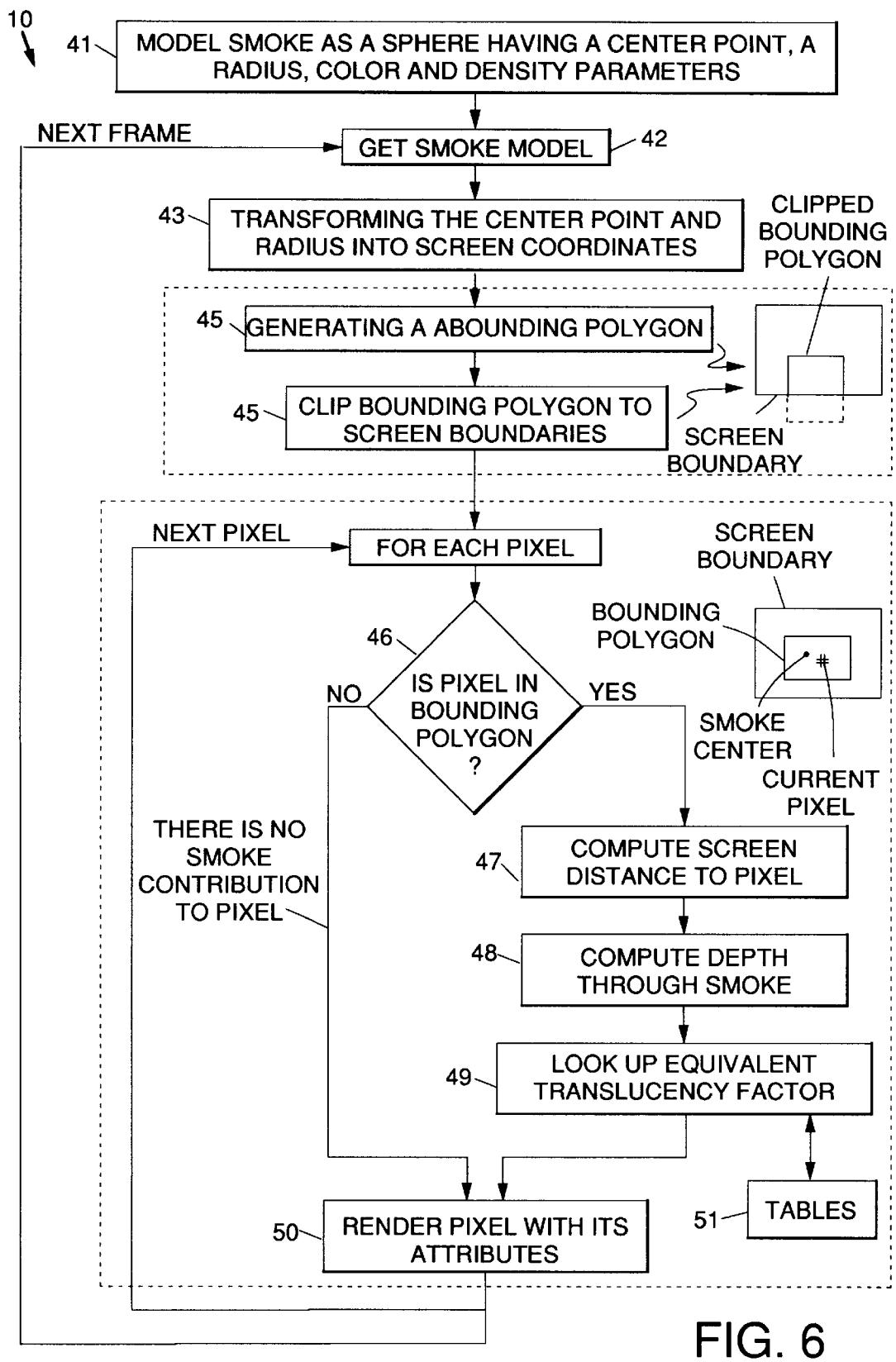
FIG. 6 shows a flow diagram illustrating the method of the present invention.

For the purposes of completeness, and referring to FIG. 6, it shows a flow diagram illustrating the details of one embodiment of the present method 10. The steps in the method 10 of generating and displaying smoke are as follows. The first step comprises modeling smoke as a sphere having a center point, a radius, color and density parameters, as indicated in box 41. The method 10 processes data one frame at a time. Once the smoke model is formed, the basic method begins by accessing the smoke model, as indicated in box 42. The next step comprises transforming the center point and radius of the sphere into display screen coordinates, as indicated in box 43. The next step comprises generating a bounding polygon, as indicated in box 44. The next step comprises clipping the bounding polygon to display screen boundaries, as indicated in box 45. For the purposes of clarity, to the right of box 44 is illustrated a typical screen boundary and clipped bounding polygon, illustrated within the small dashed box.

Then, for each pixel, it is determined if the pixel is within the bounding polygon, as indicated by step 46. If the pixel is in the bounding polygon, then the distance from the screen to the pixel is computed, as indicated in box 47. Then, the depth through the smoke is computed as indicated in box 48. An equivalent translucency factor is then looked up using look-up tables 51, as indicated in box 49. The final step comprises rendering the pixel with its attributes, as indicated in box 50. For the purposes of clarity, an illustration of a typical screen boundary, bounding polygon disposed within the screen boundary, smoke center and current pixel are shown which illustrate what occurs in steps 46–50, illustrated within the large dashed box.

In the event that the pixel is not within the bounding polygon determined at step 46, then the method 10 jumps directly to the rendering step 50. The method 10 loops to each pixel and repeats steps 46–50. Once all pixels in a particular frame are processed, the method 110 repeats steps 42–50 for the next frame, and so on.

The method 10 described above was tested by emulation and found to work well. Originally, it was thought that it might take as many as a dozen overlapping smoke spheres 11 to make an acceptable looking smoke cloud. However, the testing showed that the use of fewer smoke spheres 11 was acceptable, and that even a single smoke sphere 11, truncated by a ground plane to appear like a fuzzy hemisphere, would serve well for many purposes.

Thus there has been described a new and improved computer-implemented method of simulating smoke that generates one or more opaque spheres to simulate the smoke. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A computer-implemented method of rendering an image of smoke or clouds in an image generator for display of pixels on a display device, said method comprising the steps of:

modeling the smoke as a sphere having nonuniform smoke density, and that is comprised of a center point in three-dimensional model space, a radius, and set of parameters defining its nonuniform density and color;

transforming the center point to screen coordinates;

transforming the radius to a screen coordinate radius;

generating a bounding polygon that surrounds a projection of the sphere in screen coordinates;

clipping the bounding polygon to boundaries of the display device; and for each pixel in the image, rendering a smoke effect by:
testing if the pixel is within the bounding polygon;
computing an equivalent translucency factor for the smoke at the pixel based upon location of the pixel with respect to the transformed center point, the screen coordinate radius, the set of parameters defining its nonuniform density and color, and penetration depth through the smoke; and
computing the smoke effect for the pixel based upon the equivalent translucency factor.

2. The method of rendering an image of smoke in claim 1 wherein the bounding polygon is generated as a square centered at the transformed center of the smoke sphere with each edge of the square equal to twice the screen coordinate radius of the smoke.

3. The method of rendering an image of smoke in claim 1 wherein the step of computing the equivalent translucency factor for the smoke at the pixel comprises using the penetration depth and the screen distance from the pixel to the transformed smoke center to look up the translucency factor for the pixel in a precomputed table.

4. The method of rendering an image of smoke in claim 1 which further comprises the step of:

for each pixel, applying a texture to the smoke effect.

5. The method of rendering an image of smoke in claim 1 which further comprises the steps of:

modeling a plurality of smoke spheres; and for each pixel, rendering the smoke effect of each smoke sphere by combining the equivalent translucency factors for each smoke sphere.

\* \* \* \* \*